(12) United States Patent
Fenkart

(10) Patent No.: US 9,370,054 B2
(45) Date of Patent: Jun. 14, 2016

(54) OPERATION OF A LAMP WITH AN AUTONOMOUS ENERGY STORE

(75) Inventor: Karl-Heinz Fenkart, Hohenems (AT)

(73) Assignee: TRIDONIC GMBH & CO KG, Dornbirn (AT)

(*) Notice: Subject to any disclaimer, the term of this patent is extended or adjusted under 35 U.S.C. 154(b) by 0 days.

(21) Appl. No.: 14/239,001

(22) PCT Filed: Aug. 14, 2012

(86) PCT No.: PCT/EP2012/065384
§ 371 (c)(1),
(2), (4) Date: Jun. 17, 2014

(87) PCT Pub. No.: WO2013/020963
PCT Pub. Date: Feb. 14, 2013

(65) Prior Publication Data
US 2014/0312804 A1    Oct. 23, 2014

(51) Int. Cl.
*H05B 37/00* (2006.01)
*H05B 33/08* (2006.01)
*H02J 3/14* (2006.01)
*H02J 9/06* (2006.01)

(52) U.S. Cl.
CPC . *H05B 33/08* (2013.01); *H02J 3/14* (2013.01); *H02J 9/065* (2013.01); *H05B 33/0815* (2013.01); *H02J 2003/143* (2013.01); *H02J 2003/146* (2013.01); *Y02B 70/3225* (2013.01); *Y02B 70/3266* (2013.01); *Y02B 70/3291* (2013.01); *Y04S 20/222* (2013.01); *Y04S 20/224* (2013.01); *Y04S 20/242* (2013.01); *Y04S 20/248* (2013.01)

(58) Field of Classification Search
USPC ............ 315/86, 209 R, 224, 227 R, 291, 307, 315/308; 307/48, 66, 85, 86
See application file for complete search history.

(56) References Cited

U.S. PATENT DOCUMENTS

| | | | |
|---|---|---|---|
| 5,917,251 A | 6/1999 | Schermann | |
| 7,218,056 B1 | 5/2007 | Harwood | |
| 8,033,686 B2 * | 10/2011 | Recker et al. | 362/249.02 |
| 8,508,152 B1 * | 8/2013 | Gordin et al. | 315/291 |
| 8,796,946 B2 * | 8/2014 | Rohner et al. | 315/291 |
| 2008/0024008 A1 | 1/2008 | Chiu et al. | |
| 2008/0100143 A1 * | 5/2008 | Lipcsei | 307/80 |
| 2010/0038965 A1 * | 2/2010 | Rohner et al. | 307/66 |
| 2010/0060189 A1 * | 3/2010 | Stevens et al. | 315/291 |

(Continued)

FOREIGN PATENT DOCUMENTS

| | | |
|---|---|---|
| AT | 502460 B1 | 1/2009 |
| DE | 2639506 C2 | 10/1986 |
| DE | 19516838 A1 | 11/1996 |
| DE | 102004017713 A1 | 11/2004 |

(Continued)

*Primary Examiner* — Thuy Vinh Tran
(74) *Attorney, Agent, or Firm* — Volpe and Koenig, P.C.

(57) ABSTRACT

An operating device (1) for operating an illuminant (2) is proposed, having: an energy storage unit (3) for storing electrical energy, a charging circuit (4), requiring the supply of a mains voltage (Vin), for charging the energy storage unit (3) during a charging mode of operation, a driver circuit (7), supplied with power by means of the energy storage unit (3) during a storage mode of operation, for operating the illuminant (2), and a control unit (8) for activating the charging mode of operation or the storage mode of operation independently of the state of the mains voltage (Vin), particularly independently of the level of the mains voltage (Vin).

8 Claims, 3 Drawing Sheets

(56) References Cited

U.S. PATENT DOCUMENTS

| | | |
|---|---|---|
| 2010/0207448 A1 | 8/2010 | Cooper et al. |
| 2011/0153106 A1 | 6/2011 | Drake et al. |
| 2011/0252247 A1 | 10/2011 | Yokoyama |
| 2012/0001548 A1* | 1/2012 | Recker et al. .................. 315/86 |
| 2012/0319477 A1* | 12/2012 | Brownlee ....................... 307/23 |

FOREIGN PATENT DOCUMENTS

| | | |
|---|---|---|
| DE | 69636566 T2 | 8/2007 |
| DE | 102006030655 A1 | 10/2007 |
| DE | 102010042030 A1 | 10/2011 |
| GB | 2429343 A1 | 2/2007 |
| JP | 8126200 A | 5/1996 |

* cited by examiner

OPERATION OF A LAMP WITH AN AUTONOMOUS ENERGY STORE

FIELD OF THE INVENTION

The invention relates to an operating device for operating at least one light-emitting means by means of an autonomous energy store and to a luminaire comprising such an operating device, to a method for operating or for controlling such an operating device, to an integrated circuit, to a computer software program product, and to a lighting system.

BACKGROUND

It is already known from the prior art to use also emergency lighting devices in addition to the luminaires to which a mains voltage is supplied. These emergency lighting devices are used in the event of failure of the mains supply in order to ensure a minimum level of illumination in areas in which luminaires to which mains voltage is supplied are installed.

Such emergency lighting devices are capable of monitoring the mains supply voltage and correspondingly establishing an emergency lighting operation as soon as, for example, the mains voltage is below a preset threshold value. Generally, in order to identify the state of the grid, a voltage which is representative of the mains voltage is measured. It is possible, for example, for the mains voltage to be measured directly via an input-side voltage divider. Given knowledge of an emergency state, in particular an excessively low supply voltage, the emergency state of the emergency lighting device is then activated, in which an internal battery or an internal rechargeable battery for supplying power to a lamp is switched on.

Secondly, there are grids in which different prices for the mains supply are demanded at different times. In particular, the current may have a more favorable tariff at night than during the day. In the case of some domestic appliances, the consumer may make use of this tariff system by virtue of switching on certain appliances at night. For example, it is possible to program washing machines or dishwashers such that they are automatically started at night.

Against the background of this prior art, the present invention is now based on the object of improving the operation of light-emitting means with a view to the differentiated tariff system for mains supply.

SUMMARY

The central concept of the invention now consists in that a luminaire comprises an energy store, from where the luminaire can be operated over a relatively long period of time in the same way as when it is operated on mains voltage.

During times in which an energy provider's demands increases prices for the supply, the luminaire can then be operated from the energy store, wherein the energy store is recharged during more favorable energy times.

In contrast to emergency lighting systems, therefore, the luminaire is then also operated from the energy store during these times of increased tariffs although the AC supply, in contrast to the emergency light case, has not broken down.

The energy supply from the store can be used in support of or in addition to the AC supply.

The operating device in the luminaire has either internal intelligence which switches the operating mode between AC supply/autonomous supply, or alternatively or in addition the signal in respect of whether the luminaire is now intended to be operated preferably from the autonomous energy supply or not can be communicated from outside either via a separate control line, for example bus line or wirelessly, or via an information item modulated onto the AC supply itself via a carrier frequency system or powerline communication (PLC). This operation clocking can in the meantime also be switched on by the user, for example, via switches, rotary actuators, etc. comparable to a time switch.

The operating device in the luminaire can itself also adaptively learn the durations during which the luminaire should preferably be operated by the autonomous energy supply, for example via the nature of the activation by the user (switch on/off operations), by brightness signals from a light sensor, etc.

For example, the operating circuit can also initiate recharging of the autonomous energy supply when a decision is made for nighttime power on the basis of the fact that the luminaire has already not been operated for a relatively long period of time.

For example, specially equipped highly capacitive capacitors, super capacitors or super caps can be used as energy store. Alternatively, batteries or rechargeable batteries can also be used.

The control circuit in the operating device also performs the control of the charging/discharging management for the energy store.

A preferred embodiment is the use of LEDs as light-emitting means since, in the case of these LEDs, owing to their typical operating voltages, the autonomous energy supply from a battery can be operated identically to the provision of a low-voltage bus voltage by the first stage of a converter.

In accordance with a first aspect of the present invention, therefore, an operating device for operating a light-emitting means is proposed, comprising
    an energy storage unit for storing electrical energy,
    a charging circuit to which a mains voltage is to be supplied for charging the energy storage unit during a charging operating mode,
    a driver circuit to which power is supplied by the energy storage unit during a storage operating mode for operating the light-emitting means, and
    a control unit for activating the charging operating mode or the storage operating mode independently of the state of the mains voltage, in particular independently of the level of the mains voltage.

In accordance with a further aspect of the present invention, a method for operating a light-emitting means is proposed, comprising
    charging an energy storage unit by means of a charging circuit to which a mains voltage is supplied during a charging operating mode,
    operating the light-emitting means by means of a driver circuit, to which power is supplied by the energy storage unit, during a storage operating mode,
    wherein a control unit activates the charging operating mode or the storage operating mode independently of the state of the mains voltage, in particular independently of the level of the mains voltage.

In such an operating device or method, in the event of a mains supply with a high-tariff current or in the event of a high load phase or peak load phase of the supply grid, there can be switchover to the storage operating mode. In other words the storage operating mode can be performed during times in which the price for the mains supply and/or the load on the supply grid are comparatively high.

Preferably, in the event of a mains supply with a low tariff current or in the event of a weak load phase of the supply grid, there is a switchover to the charging operating mode.

Information items, for example, relating to the current tariff or the load of the supply grid can be communicated to the control unit.

The information items can be communicated via a PLC receiver via powerline communication, via a control line such as, for example, a digital bus line, via a user interface or via a sensor.

Preferably, provision can be made of a mains driver circuit for operating the light-emitting means during a mains operating mode, wherein, during the storage operating mode, the mains driver circuit is switched off.

In accordance with a further aspect of the present invention, a luminaire is proposed, comprising a light-emitting means and an above-described operating device for operating the light-emitting means.

The light-emitting means can preferably be a light-emitting diode.

In accordance with a further aspect of the present invention, an integrated circuit is proposed, in particular an ASIC, for implementing the above method.

In accordance with a further aspect of the present invention, a computer software program product is proposed, which supports the above method when it is run on a microcomputer.

In accordance with a further aspect of the present invention, a lighting system is proposed, said lighting system comprising a plurality of luminaires which each comprise a light-emitting means and an operating device for operating the light-emitting means, wherein, in the event of a mains supply with a high-tariff current or in the event of a high load phase or peak load phase of the supply grid, at least one light-emitting means of a luminaire is switched off.

In this case, a central unit can communicate the commands for switch off of the light-emitting means via a control line or via powerline communication via mains lines to the respective operating device.

At least one predetermined operating device automatically can switch off its light-emitting means if a high tariff current or a high load phase or peak load phase of the supply grid is identified.

BRIEF DESCRIPTION OF THE DRAWINGS

Further advantages, features and properties of the present invention will now be explained with reference to the figures of the attached drawings.

DETAILED DESCRIPTION OF THE PREFERRED EMBODIMENTS

Figure 1:
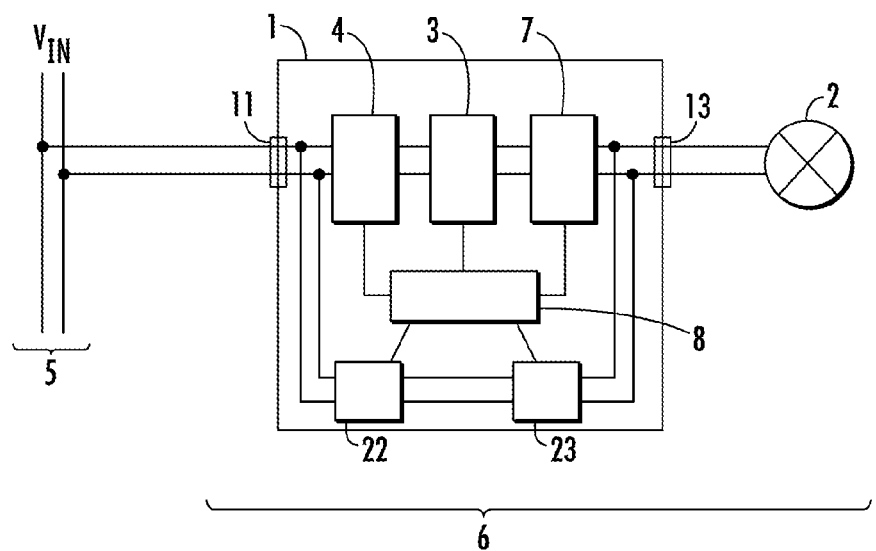
FIG. 1 shows, schematically, an operating device and a system in accordance with the present invention.

The operating device according to the invention which is illustrated schematically in FIG. 1 and is generally provided with the reference symbol 1 is intended for operating a light-emitting means 2 in the exemplary embodiment illustrated. A luminaire 6 comprises the operating device 1 and the light-emitting means 2. The operating device 1 is connected on the input side to a power supply grid, which makes available a mains supply voltage Vin, and for this has a mains voltage input 11 which can be connected to mains lines 5. The mains voltage can in this case be present as AC voltage, rectified AC voltage or DC voltage.

The operating device 1 furthermore has, as essential components, a charging circuit 4, an energy storage unit 3 and a driver circuit 7 and a control unit 8. The mains voltage Vin which is used for charging the energy storage unit 3 is supplied to the charging circuit 4 on the input side. The charging is performed during a charging operating mode.

The completely or only partially charged energy storage unit 3 supplies power to the driver circuit 7 in a storage operating mode, which driver circuit in turn operates the light-emitting means 2 in a known manner. The light-emitting means 2 can be connected to the driver circuit 7 via a supply output 13 of the operating device 1.

A mains processing unit 22 and a mains driver circuit 23 are provided in parallel with the series circuit comprising the charging circuit 4, the energy storage unit 3 and the driver circuit 7. The mains processing unit 22, as is known, is used for processing the supplied mains voltage Vin by virtue of, for example, the voltage being rectified and/or smoothed or by virtue of active or passive power factor correction being implemented. The active power factor correction can be formed, for example, by a step-up converter or a flyback converter.

The processed voltage is then supplied to the mains driver circuit 23, which supplies power to the light-emitting means 2. The mains driver circuit 23 is controlled by the control unit 8, as is known. The mains driver circuit 23 can be configured, for example, in the form of an inverter with a half-bridge circuit (not shown), wherein two switches of the half-bridge circuit which are connected in series and to which a DC voltage is supplied are clocked in opposition by the control unit 8 in order to provide a desired output voltage or a desired output power at the supply output 13.

In addition to the storage operating mode, in which the light-emitting means 2 is supplied exclusively with the electrical energy stored in the energy storage unit 3, a further operating mode is thus provided. That is to say, the light-emitting means 2 can be supplied with power in a mains operating mode by the mains driver circuit 23 via the mains voltage Vin. The driver circuit 7 and the mains driver circuit 23 can be exclusively switched on in the respective mode. Alternatively, in a hybrid operating mode, the control unit 8 can actuate the operating device 1 such that both the driver circuit 7 and the mains driver circuit 23 are active simultaneously and provide power for operating the light-emitting means 2.

Figure 2:
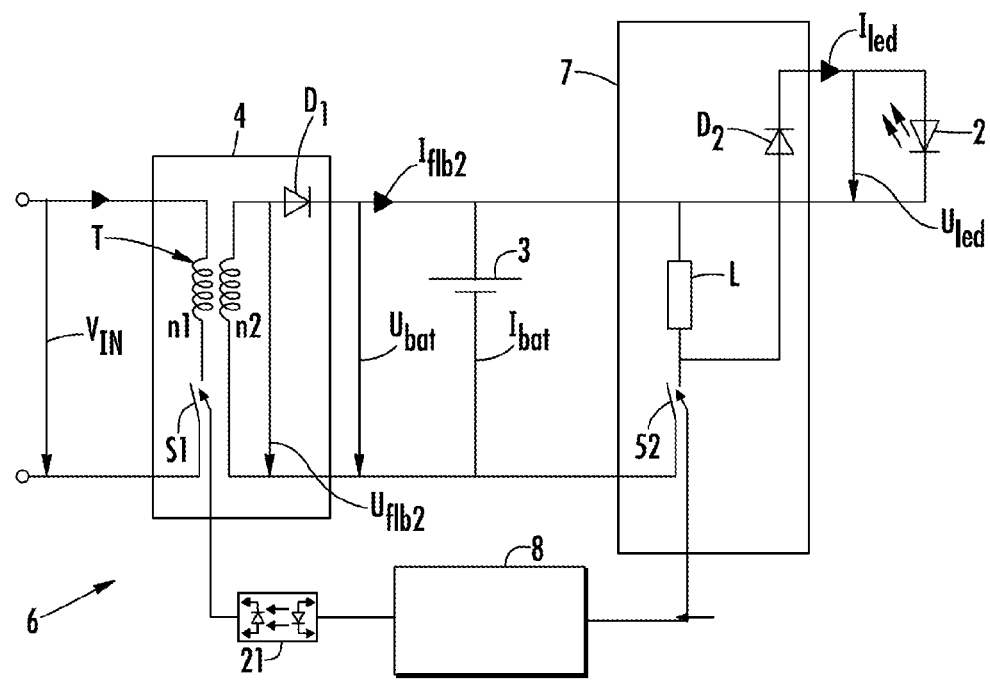
FIG. 2 shows, schematically, a further exemplary embodiment of the present invention.

FIG. 2 shows a particular embodiment of part of the operating device 1 of the invention. FIG. 2 does not show the mains processing unit 22 and the mains driver circuit 23. In this case, the charging circuit 4 is formed by a so-called flyback converter, which comprises firstly a transformer T with a primary winding n1 and a secondary winding n2 and secondly a controllable switch S1. In a known manner, by corresponding alternate opening and closing of the switch S1, the energy made available by the mains supply voltage Vin can be transmitted to the secondary side of the flyback converter 4 and used for charging the energy storage unit 3. The energy transmission in this case takes place in the open state of the switch S1, wherein in addition a diode D1 is provided on the output side of the flyback converter 4 for this purpose.

The actuation of the controllable switch S1 is performed by the control unit 8 of the operating device 1, wherein the actuation in particular takes place in galvanically isolated fashion via an optocoupler 21. In this case, the control unit 8 actuates the switch S1 alternately.

The energy storage unit 3 is configured in the form of a battery or a rechargeable battery. Alternatively, the energy storage unit 3 can consist of one or more double-layer capacitors or super capacitors. Advantageously, provision is made for the control unit 8 to detect the current Ibat through the energy storage unit 3 and/or the voltage drop Ubat across the energy storage unit 3. The current detection is performed in particular by a measuring shunt (not shown) connected in series with the energy storage unit 3.

The driver circuit 7 in the form of a switching controller has a further controllable switch S2, an inductance L and a diode D2. By alternate actuation of the switch S2 by the control unit 8, a current or a power is thus made available to the light-emitting means 2, via which current or power said light-emitting means is operated. The duty factor and/or the frequency at which the switch S2 is actuated by the control unit 8 can in this case be varied in order to adjust the level of the current supplied to the light-emitting means and thus the power at which the light-emitting means is operated. In this way, it is possible to ensure that the light-emitting means can nevertheless be operated at a constant power even in the event of a fluctuating power of the energy storage unit.

The light-emitting means 2 shown in the embodiment in accordance with FIG. 2 is a light-emitting diode or LED. The operating device 1 according to the invention can operate any type of light-emitting means, however, in particular gas discharge lamps or incandescent lamps. The supply output can be designed to supply one or more light-emitting means 2. The driver circuit 7 can preferably be adapted corresponding to the light-emitting means 2 connected.

Figure 3:
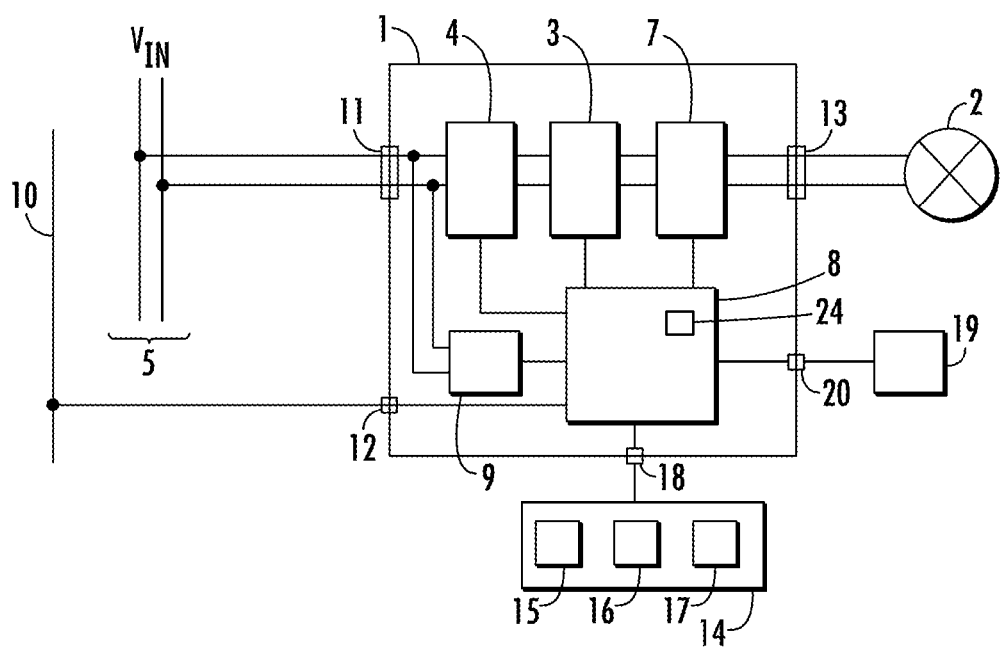
FIG. 3 shows a further embodiment of the invention.

FIG. 3 shows a further embodiment of the invention. The light-emitting means 2 can be operated, according to the invention, by the autonomous energy storage unit 3 (storage operating mode) as soon as the price for the mains supply is high or as soon as it is above a threshold value. The use of the energy storage unit 3 is not only dependent on the electrical state of the mains lines 5 or the mains supply, as in the case of an emergency lighting device, for example. In the case of an emergency lighting device, an internal battery is switched on, for example, in the event of a power failure or in the event of a mains fault in order to ensure the supply of power to the light-emitting means. A mains fault in this sense can be, for example, an undervoltage, an overvoltage, a change in frequency or the occurrence of harmonics.

The control unit 8 controls the use of the energy storage unit 3. The decision in respect of switching on or off the driver circuit 7 is performed on the basis of an information item which is representative of the price of the mains supply.

This information item is received by the control unit 8, for example, via powerline communication (PLC). A corresponding high-frequency data transmission is performed via the mains line up to the mains voltage input 11 of the operating device. The mains voltage Vin is supplied to a PLC receiver 9, which again demodulates the high-frequency modulation of the mains voltage. The demodulated information item is passed onto the control unit 8, which makes a decision in respect of switching on the driver circuit 7 on the basis of this information item, in particular relating to the price of the mains supply.

FIG. 3 also shows that the control unit 8 can receive the information item also via a control line 10 in the form of a bus, for example. The operating device 1 is correspondingly provided with a control signal input 12 in the form of a digital bus interface, for example. Incoming control signals which are transmitted by an external control unit (not shown) are monitored by the control unit 8 and evaluated in respect of the use of the energy storage unit 3 and the driver circuit 7.

A user can also communicate an item of information with respect to the price of the mains current directly via a user interface 14 and via a user interface input 18 to the control unit 8. The user interface 14 can comprise operating elements such as a pushbutton 15, a potentiometer 16 or a touchscreen 17. The information item can also be communicated to the operating device 1 via a sensor 19 and a corresponding sensor input 20, for example.

The information item relating to the current price can also be recorded in a data store 24, in particular once this information item has been received by the control unit 8. Preferably, it is also possible for the times at which low tariff current needs to be drawn to be stored in the data store 24 when the operating device is manufactured in the factory.

The PLC receiver 9, the control signal input 12, the user interface input 18 and the sensor input 20 can be used together in an operating device 1. Alternatively, a subset of these four elements can also be provided. In particular, the operating device 1 can have only the PLC receiver 9, only the control signal input 12, only the user interface input 18 or only the sensor input 20 for communicating information items.

The information item communicated to the control unit 8 relates preferably to the present price for the mains supply, wherein this price can entail immediate switching-on of the driver circuit 7. Alternatively, the information item can also, however, relate to an as yet invalid, future price or to a change in price. For example, the information item then consists of a price per unit energy and a time indication from when the provided price is valid. It is also conceivable for the time indication to determine the time until which a given price is valid. All of these information items can be stored in the data store 24.

The information item on the basis of which the driver circuit 7 is switched on and off relates to the current price in the above-described exemplary embodiment. According to the invention, the actual current price or a value which is representative of the current price is communicated, wherein then the control unit 8 needs to decide whether, at this price, the storage operating mode (via the energy storage unit 3 and driver circuit 7) or the mains operating mode (by mains supply via the mains processing unit 22 and mains driver circuit 23) should rather be used for operating the light-emitting means. This decision is preferably made on the basis of experience-based values by virtue of the control unit 8 comparing previously received price indications stored in the data store 24 with the present indication. For example, when the present current price is above a mean value of the previous price indications, a switchover is performed to the storage operating mode.

Alternatively or in addition, it is not directly the current price but a more general information item relating to the tariff system that is communicated to the control unit 8. Preferably, it is possible to communicate whether the supply via the mains line 5 corresponds to a high tariff current or a low tariff current. If a high tariff is present, the energy storage unit 3 and the driver circuit 7 are used corresponding to the storage operating mode.

Alternatively or in addition, it is also possible merely to communicate the time at which the high tariff current is valid. In the event of the occurrence of a high tariff current, there is a change to the storage operating mode.

In contrast, in the case of a low tariff current or in the case of a low current price, the light-emitting means 2 can be operated and supplied with power via the mains driver circuit 24 (mains operating mode). At the same time, a phase with a relatively low price can be used to charge the energy storage unit 3 (charging operating mode). This charging is performed by virtue of the charging circuit 4 to which mains voltage Vin is supplied being controlled correspondingly by the control unit 8.

Alternatively or in addition, information items relating to the mains load, in particular how high the mains load is or whether a weak load phase or a high load phase or peak load phase is present, are communicated to the operating device 1. In a peak load phase, there is preferably a changeover to the storage operating mode. In a weak load phase, there is switchover preferably to the mains operating mode for operating the light-emitting means 2 and to the charging operating mode for charging the energy storage unit 3.

Alternatively or in addition, a command signal can be transmitted to the control unit 8, for example via the PLC receiver 9 or via the control line 10, which command signal automatically initiates the storage operating mode or the mains operating mode. Preferably, at the same time as the mains operating mode also the charging operating mode is started for charging the energy storage unit 3.

Figure 4:
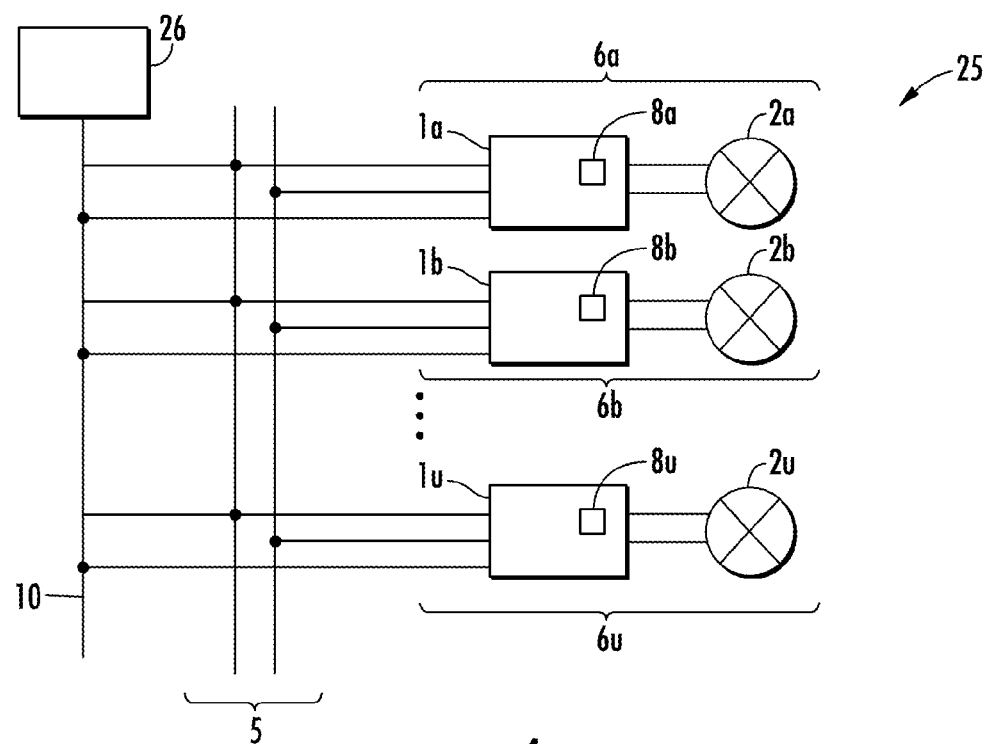
FIG. 4 shows an embodiment of a lighting system in accordance with the present invention.

FIG. 4 shows an embodiment of a lighting system in accordance with the present invention.

A plurality of luminaires 6a, 6b, 6n are provided in a lighting system 25. This is firstly in order to meet the standards in respect of illuminance, glare reduction or brightness uniformity. Secondly, a plurality of luminaires also ensures the ceiling coverage which increases user comfort and ensures general acceptance of the lighting system 25. It is not unconventional for both the first mentioned and the second mentioned requirements to be met to excess.

A luminaire 6a, 6b, 6n according to the invention comprising in each case one light-emitting means 2a, 2b, 2n and one operating device 1a, 1b, 1n according to the invention comprising a control unit 8a, 8b, 8n can be switched over to the storage operating mode, as described above, in the event of a high tariff current or in the event of a peak load phase of the supply grid.

Previously defined operating devices 1a, 1b, 1n can alternatively switch off their associated light-emitting means 2a, 2b, 2n as soon as a high tariff current or a peak load phase of the supply grid is identified. The previously defined operating devices 1a, 1b, 1n are preferably selected such that their assigned light-emitting means 2a, 2b, 2n can be switched off without the abovementioned requirements placed on the lighting system 25 being impaired.

Since, however, the requirements in terms of illumination can be met to excess, during times in which the mains supply has a very high price or in the case of mains supply with high tariff current or in the case of peak load conditions, the invention proposes reducing the illuminance of the lighting system 25 as a whole. For this, it is proposed to entirely disconnect one or a plurality of luminaires. That is to say that, instead of changing over to the storage operating mode, the light-emitting means of the respective operating device is not operated or is switched off. Thus, costs can be saved.

Preferably, a central unit 26 decides which light-emitting means 2a, 2b, 2n should be switched off. For this, the central unit 26 transmits corresponding commands via the control line 10. Alternatively, the commands can be communicated via the mains line via powerline communication.

LIST OF REFERENCE SYMBOLS 1, 1a, 1b, 1n Operating device
2, 2a, 2b, 2n Light-emitting means
3 Energy storage unit
4 Charging circuit
5 Mains line with mains voltage Vin
6, 6a, 6b, 6n Luminaire
7 Driver circuit
8, 8a, 8b, 8n Control unit
9 PLC receiver
10 Control line
11 Mains voltage input
12 Control signal input
13 Supply output
14 User interface
15 Pushbutton
16 Potentiometer
17 Touchscreen
18 User interface input
19 Sensor
20 Sensor input
21 Optocoupler
22 Mains processing unit
23 Mains driver circuit
24 Data store
25 Lighting system
26 Central unit
D1, D2 Diode
L Inductance
n1 Primary winding
n2 Secondary winding
S1, S2 Switch
T Transformer

The invention claimed is:

1. A plurality of operating devices for operating a plurality of luminaires, the luminaire each comprising a light-emitting means, each of the operating devices comprising an energy storage unit for storing electrical energy, a charging circuit to which a mains voltage (Vin) is to be supplied for charging the energy storage unit during a charging operating mode, a driver circuit to which power is supplied by the energy storage unit during a storage operating mode for operating the light-emitting means, and a control unit for activating the charging operating mode or the storage operating mode independently of the state of the mains voltage (Vin) wherein the plurality of operating devices operate the plurality of luminaires, and in the event of a mains supply with a high tariff current or in the event of a high load phase or peak load phase of a supply grid, the light-emitting means of at least one of the plurality of luminaires is switched off, and wherein a central unit communicates commands for switch-off of the light-emitting means of the at least one of the plurality of luminaires via a control line or via powerline communication or via mains lines to a respective operating device.

2. The plurality of operating devices as claimed in claim 1, wherein, in the event of a mains supply with a high tariff current or in the event of a high load phase or peak load phase of a supply grid, there is a switchover to the storage operating mode.

3. The plurality of operating devices as claimed in claim 1, wherein, in the event of a mains supply with a low tariff current or in the event of a weak load phase of a supply grid, there is a switchover to the charging operating mode.

4. The plurality of operating devices as claimed in claim 1, wherein information items relating to a current tariff or a load of the supply grid are communicated to the control units.

5. The plurality of operating devices as claimed in claim 4, wherein the information items are communicated via at least one of: a PLC receiver or powerline communication or a control line (10).

6. The plurality of operating devices as claimed in claim 1, each operating device further comprising a mains driver circuit for operating the corresponding light-emitting means during a mains operating mode, wherein, during the storage operating mode, the mains driver circuit is switched off.

7. A method for operating a plurality of light-emitting means, the method comprising:
provide a plurality of operating devices, each is arranged for operating one of the plurality of light-emitting means and comprises an energy storage unit, a charging circuit, a driver circuit, and a control unit;
charging each of the energy storage units by means of the corresponding charging circuit to which a mains voltage (Vin) is supplied during a charging operating mode;
operating the light-emitting means corresponding to each of the operating devices by means of the corresponding driver circuit, to which power is supplied by the corresponding energy storage unit during a storage operating mode, wherein the corresponding control unit activates the charging operating mode or the storage operating mode independently of the state of the mains voltage (Vin); and
switching off, in the event of a mains supply with a high tariff current or in the event of a high load phase or peak load phase of a supply grid, at least one of the plurality of light-emitting means, wherein switching off the at least one of the light-emitting means is carried out by communicating commands from a central unit via a control line or powerline communication or mains lines.

8. The method according to claim 7, wherein the operating devices are comprised in an integrated circuit.

* * * * *